United States Patent [19]

Miki et al.

[11] 4,140,457
[45] Feb. 20, 1979

[54] METHOD FOR PRODUCING TRANSPARENT PLASTIC MOLDED ARTICLES AND THERMOFORMING APPARATUS THEREFOR

[75] Inventors: Kyosuke Miki, Yokohama; Masahiro Takeuchi, Yamato, both of Japan

[73] Assignee: Sumitomo Bakelite Company Limited, Tokyo, Japan

[21] Appl. No.: 822,014

[22] Filed: Aug. 4, 1977

Related U.S. Application Data

[62] Division of Ser. No. 718,325, Aug. 27, 1976.

[30] Foreign Application Priority Data

Sep. 2, 1975 [JP] Japan .................. 50-105614
Sep. 2, 1975 [JP] Japan .................. 50-105615

[51] Int. Cl.² .................................................... B29C 17/00
[52] U.S. Cl. .................................... 425/384; 425/398;
425/445; 425/DIG. 53; 425/DIG. 235
[58] Field of Search ............ 425/384, 398, 385, 404,
425/DIG. 235, DIG. 53, 66, 445

[56] References Cited

U.S. PATENT DOCUMENTS

| 2,585,915 | 2/1952 | Chavannes | 425/384 X |
| 3,131,425 | 5/1964 | Jacobs et al. | 425/384 X |
| 3,333,032 | 7/1967 | Dickinson | 425/384 X |
| 3,570,054 | 3/1971 | Seanor et al. | 425/66 X |
| 3,608,056 | 9/1971 | Nelson | 425/66 X |
| 3,966,860 | 6/1976 | Hudson et al. | 425/388 X |

*Primary Examiner*—Robert L. Spicer, Jr.
*Attorney, Agent, or Firm*—Karl W. Flocks

[57] ABSTRACT

This invention provides a simple and advantageous method for producing plastic moldings with good surface gloss, very excellent transparency and high stiffness from crystalline polypropylene sheets manufactured by a generally employed industrial method without adversely affecting mechanical strength, shape retention at high temperatures and other properties according to a thermoforming process. This invention, more specifically, concerns a method for producing transparent polypropylene molded articles, characterized by heating a polypropylene sheet at a temperature higher than the melting point thereof, stretching it by more than 5%, rapidly cooling it to a temperature of not more than 120° C., and then subjecting the thus treated sheet to thermoforming at a temperature below the melting point of the sheet.

2 Claims, 1 Drawing Figure

U.S. Patent  Feb. 20, 1979  4,140,457
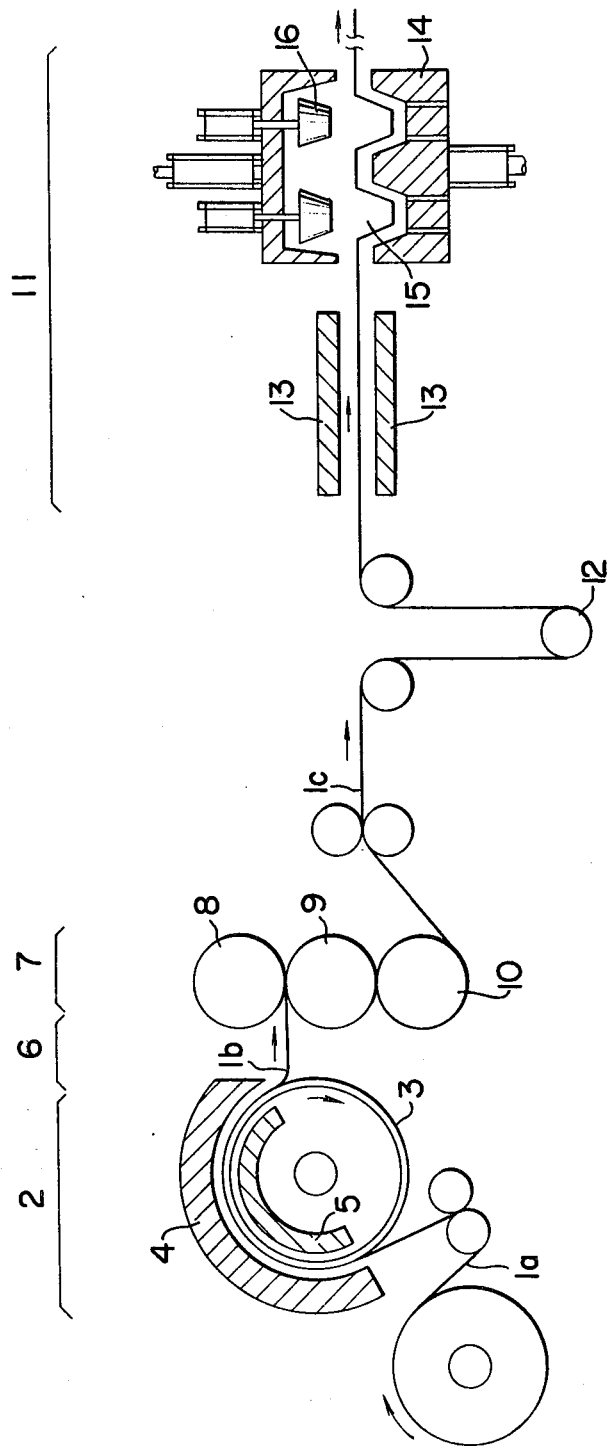

METHOD FOR PRODUCING TRANSPARENT PLASTIC MOLDED ARTICLES AND THERMOFORMING APPARATUS THEREFOR

This is a division of application Ser. No. 718,325, filed Aug. 27, 1976.

This invention relates to a thermoforming method and a thermoforming apparatus for producing moldings with high strength and excellent transparency from polypropylene sheets.

More particularly, this invention provides a simple and advantageous method and apparatus for producing, according to a thermoforming process, moldings with very excellent transparency from crystalline polypropylene sheets manufactured by a commonly employed industrial method, without sacrificing the mecanical strength, shape retention at high temperatures and other desirable properties of the polypropylene.

Recently, in order to provide the sheets having not only high heat resistance but also excellent chemical and mechanical properties, there have been developed biaxially stretched sheets of crystalline plastic materials such as polyester, nylon, polypropylene, etc. However, as these biaxially stretched sheets are those which have undergone stretching at a high stretching ratio of about 300 to 1,000%, it is extremely difficult to produce therefrom moldings with good mold fidelity according to the known thermoforming techniques.

The polypropylene sheets have many excellent properties such as high heat and oil resistance and high strength for their light weight, so that they are best suited for use as wrappers or packages of foods, medicines, and the like.

However, the polypropylene sheets manufactured by the commonly employed industrial methods involve some serious problems. For example, when they are melted for thermoforming, no transparent moldings can be obtained, and also, since the sheet sags greatly when melted, it is hard to obtain the moldings free of wrinkles. Thus, the moldings produced from the polypropylene sheets according to the conventional thermoforming methods are poor in transparency, and hence they are low in commercial value and limited in their use.

The present inventors have conducted extensive research aiming at obtaining thermoformed articles with high transparency from the commercially available opaque polypropylene sheets manufactured by the prevailing industrial methods such as melt extrusion, and have consequently found that if a polypropylene sheet is first heated to a temperature higher than the melting point thereof, slightly stretched, thereafter rapidly cooled, and then subjected to thermoforming to a desired shape at a temperature below the melting point of the polypropylene, the resultant molded article has surface gloss and transparency far higher than those of the molded articles obtained from the conventional extruded polypropylene sheets.

According to this invention, there is provided a method for producing transparent polypropylene molded articles characterized by heating a polypropylene sheet at a temperature not lower than the melting point thereof, stretching the sheet at a stretching ratio of at least 5%, then rapidly cooling it to a temperature of not more than 120° C., and then subjecting the thus treated sheet to thermoforming at a temperature below the melting point. The thermoforming apparatus used for practicing the above method is characterized by being provided with a sheet-melting zone, a stretching zone and a cooling zone, all positioned in front of a thermoformer.

The sheet used in the method of this invention may be composed principally of a propylene homopolymer or a propylene copolymer such as ethylene-propylene randum copolymer or ethylene-propylene block copolymer, though the homopolymer is most preferable.

The polypropylene sheet used in this invention can be produced by an extruder or calender rolls, though it is most desirable to use a sheet having a thickness of 2.0 to 0.1 mm and produced by melt extrusion. The thicker the sheet, the harder the production of an internally uniform sheet by the melting, stretching and rapid cooling treatments becomes. If the thickness of a sheet is less than 0.1 mm, desired thermoforming can not be attained.

For heating the polypropylene sheet at a temperature higher than the melting point thereof to melt the sheet, there may be employed any suitable method such as a radiant heating method, a hot air circulation method or a contact heating method. For sufficiently melting the sheet, it is heated at a temperature higher than the melting point thereof, preferably 180° to 220° C. If the maximum heating temperature is too low, it may become impossible to get rid of the spherulite texture which is a primary cause of opacification, and when the maximum heating temperature is too high, there is a fear of heat degradation of polypropylene.

The sheet heated at a temperature higher than the melting point is stretched at a stretching ratio of at least 5% and then rapidly cooled to a temperature of not more than 120° C. Said rapid cooling may be accomplished by a roll cooling method, a press cooling method, a dipping method or the like. For obtaining a clear and transparent molded article with good surface luster, it is preferable to perform said quick cooling after stretching the molten sheet of 140° to 200° C. by at least 5%, preferably 10 to 150%. The sheet is preferably stretched monoaxially or biaxially, and biaxial stretching is particularly preferred for shallow drawing which requires a relatively high stretching ratio. Although it is possible to obtain a relatively transparent molded article by subjecting the unstretched molten sheet to rapid cooling, a product with higher transparency and better surface gloss can be obtained by the present method by which the rapid cooling is performed after effecting the stretching to a certain extent. If the stretching ratio is less than 5%, the degree of transparency of the obtained article is almost the same as obtained by rapid cooling the unstretched sheet to a temperature below 120° C.

The optimum stretching ratio of the sheet varies depending on the forming depth of the molded article. In the case of a deep-draw cup-shaped article, a stretching ratio of about 5 to 50% is preferred for obtaining good transparency and surface gloss as well as high mold fidelity of the molded article. In the case of the shallow-draw formings such as trays, lids and the like, a stretching ratio of 50 to 150% is preferable for securing good transparency and surface gloss as well as high mold fidelity. The higher the stretching ratio, the more difficult the production of an article with good mold fidelity. For effecting the rapid cooling of the sheet, is is particularly desirable to pass the sheet through between the cooling rolls which have been polished to a high degree. The sheet temperature immediately after the rapid cooling should be not more than 120° C., preferably not more than 110° C. If the sheet temperature immediately after the rapid cooling becomes higher than 120° C., the transparency of the product is reduced proportionally. For keeping the sheet immediately after the rapid cooling at a temperature of not more than 120° C., it is desirable to maintain the surface of the cooling rolls (in the case of using cooling rolls for the rapid cooling) at a temperature of not more than 80° C.

When the polypropylene sheet which has undergone heating and melting, stretching and rapid cooling is subjected to thermoforming, it is essential for maintaining the strength and for obtaining a product with excellent transparency that the temperature of the polypropylene sheet supplied to a thermoforming machine is kept lower than the melting point of the sheet, preferably 130° to 150° C. If thermoforming is carried out by heating the sheet to 130° to 150° C., it is possible to obtain a product with very excellent surface gloss and transparency. If the temperature of the sheet supplied to the forming machine becomes higher than the melting point, the transparency of the obtained product is deteriorated.

The thermoforming methods usable in the present invention include a vacuum or pressure forming method, a plug-assist vacuum or pressure forming method, a deep-draw pressure forming method utilized vertical movement of the bottom of the forming mold (for example, Japanese Patent Application No. 110,856/1975), a match molding method and a deep-draw press molding method.

By practicing the method of this invention, it is possible to produce with ease molded articles with a very excellent surface gloss and transparency as well as a high stiffness and a high mold fidelity from a polypropylene sheet manufactured by any of the prevalent industrial processes.

The present invention is now described in further detail with reference to the accompanying drawing, which shows diagramatically an embodiment of the thermoforming apparatus of the present invention.

In the drawing, it will be seen that an original sheet 1a for thermoforming is unrolled and first heated by a heating drum 3 and an external heater 4 in the sheet heating and melting zone 2. The revolving heating drum 3 is heated from the interior of the drum by an internal heater 5. The heated and melted sheet 1b in the heating and melting zone 2 is then slightly stretched in the stretching zone 6. The stretching ratio at which the sheet 1b is stretched in the stretching zone 6 is determined by the ratio of the revolving speed of the heating drum 3 to that of the first roll 8, the second roll 9 and the third roll 10 in the cooling zone 7. The thus heated, melted and stretched sheet 1b is quickly cooled while passing it through between the first and second rolls 8 and 9 which have been cooled by circulating a cooling liquid. The sheet is further cooled by the second roll 9 and the third roll 10, and the thus cooled sheet 1c is then subjected to forming by a thermoforming machine 11. The sheet 1c cooled by said cooling rolls is passed round a dancer roll 12, then heated again to a temperature not higher than the melting point by a heater for forming 13 and then subjected to pressure forming by a forming mold 14, thereby producing a molded article 15. Plugs 16 may be used depending on the depth and shape of the molded article.

In view of possible sag of the molten sheet, it is preferable to employ a drum type heating system as shown in the drawing in the sheet heating and melting zone. The heating drum used in this system is preferably a metallic drum coated with a heat-resistant resin with good releasability such as fluorine-containing resin because the molten sheet may adhere to the surface of the heating drum. It is also desirable to make an arrangement such that the heating drum is heated from the interior thereof by an internal heater and the sheet is also heated externally by an external heater. For achieving sufficient heating and melting and for obtaining a good releasability of the molten sheet from the heating drum, it is desirable to provide two or more heating zones in each of the external and internal heaters and to make it possible to adjust the heater voltage independently.

In the case of using the system shown in the drawing, the stretching ratio at which the molten sheet is stretched in the stretching zone is determined by the ratio of the revolving speed of the heating drum to that of the cooling rolls, but in order to obtain the sheets at a steady stretching ratio, it is essential to fix the position at which the sheet is released from the heating drum. Said position is determined according to the heating drum surface temperature, the sheet temperature and the ratio of the revolving speed of the heating drum to that of the cooling rolls, so that it is necessary for inducing uniform release of the sheet along its width that these temperatures are uniform along the entire width of the sheet.

When using the apparatus shown in the drawing, the stretched melted sheet is quickly cooled while passing it through between the cooling rolls. In this case, in order to obtain a quick-cooled sheet with a good appearance, care should be taken to keep the sheet uncontacted with either of the two adjoining rolls before entering therebetween. For this purpose, the sheet positioned in the stretching ratio should not sag, and also the position at which the sheet is released from the heating drum should be kept unchanged.

In the case of using rolls for cooling the sheet, it is preferable to use metal rolls which have been polished to a high degree on the surface. By using a sheet which has been rapidly cooled while rolled by the planished cooling rolls, it is possible to obtain a molded article with excellent surface gloss and transparency.

The present invention is further explained referring to Examples, but it is to be construed that these Examples are merely illustrative and not restrictive.

EXAMPLE 1

Extruded sheets (with a thickness of 0.8 mm and a width of 400 mm) of polypropylene resin (homopolymer with a melt index (MI) of 1.0) were molded according to the method of this invention, and the transparency of the obtained molded articles was compared with that of the molded articles obtained according to the conventional thermoforming process. Thermoforming of the polypropylene sheet was performed by using the apparatus shown in the drawing. The sheet was first heated at 210° C. by a revolving drum type heating unit with a diameter of 500 mm and a width of 500 mm and then stretched by the cooling rolls, 200 mm in diameter and 500 mm in width, the surfaces of which have been planished, immediately thereafter the sheets were rapidly cooled. The temperature of the sheet immediately after passing through between the first adjoining pair of cooling rolls was approximately 110° C. Water at 25° C. was circulated through the three cooling rolls.

The cooled sheet was then preheated to approximately 145° C. and subjected to plug-assist pressure forming by a thermoforming machine. Used as the forming mold was a cup-shaped mold with an inner capacity of 250 cc. For comparison, there were formed similar articles by using the sheets of the same starting material but without subjecting them to the heating, stretching and rapid cooling treatments. Shown in Table 1 are the haze, the thickness and the density of the molded articles of this invention (Run Nos. 3 to 5) (sheet stretching ratio being 5 to 20%) and those for comparison (Run Nos. 1 and 2).

Table 1

| Run No. | Stretching Ratio (%) | Shaped articles Haze (%) | Thickness (mm) | Density (g/cc) | Remarks |
|---|---|---|---|---|---|
| 1 | Non-treated | 36–45 | 0.23–0.27 | 0.8994–0.9010 | Comparative |
| 2 | 0 | 11–13 | 0.24–0.28 | 0.9010–0.9015 | Examples |
| 3 | 5 | 7–9 | 0.22–0.26 | 0.9011–0.9018 | Examples |
| 4 | 10 | 5–7 | 0.21–0.25 | 0.9012–0.9017 | of this |
| 5 | 20 | 3–6 | 0.19–0.23 | 0.9011–0.9018 | invention |

The stretching ratio ($\alpha$) of the sheet is the ratio of the elongation of the sheet which has undergone the heating, stretching and rapid cooling treatments to the length of the original sheet, and the said stretching ratio is defined by the following equation:

$$\text{Stretching ratio } (\alpha) = \frac{l - l_o}{l_o} \times 100 \, (\%)$$

where
$l_o$: length of the original sheet
$l$: length of the heated, stretched and rapidly cooled sheet Percentage haze was determined according to the method of ASTM-D-1003, while density was measured by using the gradient density tube method at 25° C.

As is apparent from Table 1, the molded articles obtained from the sheets which have undergone the heating, stretching and rapid cooling treatments (Run Nos. 3 to 5) are lower in haze and far better in transparency than the articles for comparison (Run Nos. 1 and 2).

EXAMPLE 2

Extruded sheets of polypropylene resin (homopolymer, MI = 1.0) were molded according to the method of this invention, and the transparency of the obtained molded articles was compared with that of similar articles obtained according to the conventional method. An apparatus such as shown in the drawing was used for theromoforming. The sheet was heated to 220° C. by a heating drum and then stretched 20% and rapidly cooled by cooling rolls. The temperature of water which was circulated through the cooling rolls was varied so that the temperature of the sheet immediately after passing through between the first adjoining pair of cooling rolls became 100° C. to 130° C. The forming mold and forming method were the same as in Example 1, and the preheating temperature of the sheet for pressure forming was about 145° C.

Shown in Table 2 are the haze of the molded articles of this invention (Run Nos. 1 to 5) where the sheet temperature just after passing through between the first adjoining pair of cooling rolls was 100° to 120° C., and that of molded articles for comparison (Run Nos. 6 and 7). The thickness of the molded articles was 0.25 ± 0.05 mm. The sheet temperature was measured by a surface-contacted thermometer.

Table 2

| Run No. | Rapidly cooled sheet temp. (° C) | Haze of formed articles (%) | Remarks |
|---|---|---|---|
| 1 | 100 | 4–6 | |
| 2 | 105 | 4–6 | Examples |
| 3 | 110 | 5–6 | of this |
| 4 | 115 | 5–7 | invention |
| 5 | 120 | 7–9 | |
| 6 | 125 | 17–20 | Comparative |
| 7 | 130 | 40–45 | Examples |

As is apparent from Table 2, good transparency of the molded articles is provided when the temperature of the rapidly cooled sheet is below 120° C., but transparency is reduced increasingly as the temperature of the rapidly cooled sheet exceeds 125° C.

EXAMPLE 3

Extruded sheets (thickness 0.9 mm) of polypropylene resin (homopolymer, melting point 165° C.) were treated according to the method of this invention to obtain molded articles, and the transparency of the obtained molded articles was compared. Used for the heating, stretching and rapid cooling treatments of the sheet was the apparatus shown in the drawing, and the thus treated sheet was subjected to pressure forming.

The forming mold used was of a round type with a bore diameter of 90 mm and a depth of 50 mm, and sheet forming was performed according to a deep-draw pressure forming method utilizing vertical movement of the bottom portion of the forming mold.

The sheet was first heated at 160° to 220° C., then stretched by 20% and then rapidly cooled by cooling rolls. The temperature of the sheet immediately after passing through between the first adjoining pair of cooling rolls was 110° C. The sheet preheating temperature for thermoforming was approximately 140° C.

Table 3 shows the haze of the molded articles of this invention (Run Nos. 2 to 6) where the sheet was heated to 170° to 220° C., higher than the melting point of the sheet, and that of molded article for comparison (Run No. 1) where the sheet heating temperature was lower than the melting point of the sheet. The thickness of the articles was 0.25 ± 0.05 mm.

Table 3

| Run No. | Heating temperature (° C) | Haze of formed articles (%) | Remarks |
|---|---|---|---|
| 1 | 160 | 36–44 | Comparative Example |
| 2 | 170 | 10–14 | |
| 3 | 180 | 5–7 | Examples of |
| 4 | 190 | 4–6 | this |
| 5 | 200 | 4–6 | invention |
| 6 | 220 | 4–6 | |

As is obvious from Table 3, the transparency of the molded articles is greatly improved if the sheet heating temperature is raised above the melting point of the sheet. If the heating temperature is lower than the melting point of the sheet, the transparency of the obtained articles is poor.

EXAMPLE 4

Extruded sheets (thickness 0.9 mm) of polypropylene resin (homopolymer, MI = 1.0) were thermoformed according to the method of this invention, and the transparency of the obtained molded articles was compared. The sheet was heated, stretched and rapidly cooled by using an apparatus as shown in the drawing, and then subjected to pressure forming by using the same forming mold and the same forming method as in Example 3.

The sheet was heated at 210° C., then stretched by 20%, rapidly cooled to 110° C. by cooling rolls and then subjected to pressure forming. The sheet preheating temperature for pressure forming was 130° to 170° C.

Table 4 shows the haze of the molded articles of this invention (Run Nos. 1 to 4) where the sheet preheating temperature for pressure forming was below the melting point of the sheet, and that of the article for comparison (Run No. 5) where the sheet preheating temperature was higher than the melting point of the sheet. The thickness of the molded articles was 0.25 ± 0.05 mm.

Table 4

| Run No. | Preheating temperature (°C) | Haze of formed articles (%) | Remarks |
| --- | --- | --- | --- |
| 1 | 130 | 4–6 | Examples of this invention |
| 2 | 140 | 4–6 | |
| 3 | 150 | 5–8 | |
| 4 | 155 | 15–21 | |
| 5 | 170 | 42–48 | Comparative Example |

The temperature of the preheated sheet to be subjected to thermoforming was measured by using a thermocouple.

As is apparent from Table 4, the transparency of the molded articles is markedly improved by performing thermoforming of the sheet by preheating it at a temperature below the melting point of the sheet.

As understood from the foregoing Examples of this invention, it is possible with the method of this invention to obtain from a polypropylene sheet a molded article with a very excellent surface gloss and transparency as well as a high stiffness and a high mold fidelity.

We claim:

1. A polypropylene sheet thermoforming apparatus, which comprises:
    means for heating a polypropylene sheet to 180°–220° C. and melting said sheet, comprising a metallic revolving drum, the surface of said drum being coated with a fluorine-containing resin having a good releasability; an internal heater contained in the drum; and an external heater for heating said sheet from the exterior of the revolving drum,
    sheet-stretching and cooling means downstream from said heating means and consisting of several metal rolls, the surfaces of which are polished to a high degree, for stretching the molten sheet leaving the revolving drum at a stretching ratio of 5 to 150% and cooling it to not more than 120° C. in the course of transfer of the sheet, said stretching of the moltens sheet being started at the position at which the sheet leaves the drum and being furnished at the position at which the sheet enters between a first pair of two rolls of said several rolls, said stretching ratio being adjusted by the ratio between the revolution speed of the revolving drum and that of the first two rolls, said sheet being cooled from the front and back surfaces thereof simultaneously while being passed through between the several metal rolls,
    a sheet-preheating means downstream of said cooling means and consisting of a heater for preheating the cooled sheet to a temperature lower than the melting point, and
    a thermoforming means for forming the preheated sheet, said thermoforming means being downstream of said preheating means.

2. Apparatus for thermoforming polypropylene sheeting, comprising:
    means for heating a continuously moving sheet of polypropylene film to 180°–220° C., said means comprising a rotating drum coated with a releasable surface of fluorine-containing resin; heating means within said drum to heat the surface thereof; and a heater disposed above said drum for heating the surface of the polypropylene sheeting opposite the surface in contact with said drum;
    means to continuously stretch 5–150% said heated sheeting leaving said heating means, said stretching means comprising at least one roller and means to rotate said roller at a rate higher than the rate at which said polypropylene sheeting leaves said drum;
    means to cool said stretched sheeting leaving said stretching means to a temperature not greater than 120° C., said cooling means comprising a pair of highly polished cooling rollers, and means to pass said sheet first partially around one of said rollers and then partially around another of said rollers so as to cool said sheet from both surfaces thereof;
    means to preheat said cooled film to a temperature lower than the melting point of said polypropylene, after it has left said cooling means;
    means for thermoforming said preheated polypropylene sheet, said thermoforming means being downstream of said preheating means.

* * * * *